US007817292B2

(12) United States Patent
Fujii (10) Patent No.: US 7,817,292 B2
(45) Date of Patent: Oct. 19, 2010

(54) PRINT TIME MANAGEMENT, PROGRAM, PRINT MANAGEMENT APPARATUS, PRINT TIME MANAGEMENT APPARATUS AND PRINT TIME MANAGEMENT METHOD (75) Inventor: Masato Fujii, Nagaokakyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1611 days.

(21) Appl. No.: 10/951,877

(22) Filed: Sep. 29, 2004

(65) Prior Publication Data
US 2005/0179913 A1 Aug. 18, 2005

(30) Foreign Application Priority Data
Feb. 13, 2004 (JP) ............................. 2004-037209

(51) Int. Cl.
G06F 3/12 (2006.01)
G06K 1/00 (2006.01)
(52) U.S. Cl. ...................................... 358/1.15; 358/1.1
(58) Field of Classification Search ....... 358/1.13–1.15, 358/1.1, 1.18, 402, 448; 709/250; 707/634, 707/636
See application file for complete search history.

(56) References Cited

U.S. PATENT DOCUMENTS 6,667,810 B1 * 12/2003 Jeyachandran et al. ..... 358/1.14
6,763,396 B2 * 7/2004 Torikai ......................... 709/250
6,775,729 B1 * 8/2004 Matsuo et al. ............... 710/263
6,822,754 B1 * 11/2004 Shiohara ..................... 358/1.15
7,394,558 B2 * 7/2008 Stringham .................. 358/1.15
7,450,259 B2 * 11/2008 Gassho et al. .............. 358/1.15
2004/0184080 A1 * 9/2004 Gotoh et al. ................ 358/1.15

FOREIGN PATENT DOCUMENTS

| JP | 2-146618 A | 6/1990 |
|---|---|---|
| JP | 10-157251 A | 6/1998 |
| JP | 11-134119 A | 5/1999 |
| JP | 2001-27941 | 1/2001 |
| JP | 2002-259110 | 9/2002 |
| JP | 2002-278724 | 9/2002 |

* cited by examiner

Primary Examiner—Gabriel I Garcia
(74) Attorney, Agent, or Firm—Morrison & Foerster LLP (57) ABSTRACT Print time management program product capable of calculating and indicating to the user the printing completion time with accuracy by causing a computer to execute processing including a step of transmitting to an external apparatus a request for transmission for print processing time information for jobs in a print queue, a step of receiving the print processing time information transmitted from the external apparatus in response to the request for transmission of the print processing time information and a step of displaying printing completion time for print data to be processed based on the received print processing time information.

11 Claims, 9 Drawing Sheets

TEMPORARY JOB

PJL PORTION {
```
@PJL SET AAA=nnn
@PJL SET BBB=nnn
@PJL SET ACTUALJOB =YES
@PJL SET JOBID=20040114214032
@PJL SET PROCESSINGTIME=50
@PJL SET CCC=nnn
@PJL SET ······
..............
..............
```
}

NO PRINT DATA

Fig.8

PRINT TIME MANAGEMENT, PROGRAM, PRINT MANAGEMENT APPARATUS, PRINT TIME MANAGEMENT APPARATUS AND PRINT TIME MANAGEMENT METHOD

This application is based on Japanese Patent Application No. 2004-037209 filed in Japan on Feb. 13, 2004, the entire content of which is hereby incorporated by reference.

BACKGROUND OF THE INVENTION

1. Field of the Invention

The present invention relates to a print time management program, print management apparatus, print time management apparatus and print time management method, and more particularly to a print time management program, print management apparatus, print time management apparatus and print time management method that are capable of carrying out accurate printing completion time management.

2. Description of the Related Art

A printing system comprising an image forming apparatus connected to a network and is shared by multiple users, such as a printer or MFP (Multi-Function Peripheral), and personal computers (PCs) each having a printer driver by which to output print data to the image forming apparatus, is known in the conventional art.

For example, a technology for calculating print processing time from the processing capacity of the user PC and determining appropriate printing parameters based on the results of such calculation has been proposed (Japanese Laid-Open Patent Application 2002-278724).

A system that estimates the printing completion time from the printer's processing capacity and rearranges the order of printing based on the requested printing completion time entered by the user has also been proposed (Japanese Laid-Open Patent Application 2002-259110).

A technology has also been proposed for estimating the print time in an ink jet printer connected to a peer-to-peer network (Japanese Laid-Open Patent Application 2001-27941).

However, the technologies pertaining to the conventional art referred to above entail the problem that the user cannot learn the accurate processing completion time for the print data sent by the user.

For example, in Japanese Laid-Open Patent Application 2002-278724, because the print processing time is calculated based on the user PC's processing capacity, the processing time needed by an output device such as a printer, which should comprise an important element of such calculation, is not taken into account, and therefore the printing completion time cannot be estimated accurately.

In the technologies disclosed in Japanese Laid-Open Patent Applications 2002-259110 and 2001-27941, because the jobs requested by other users and reside in the print queue of the output device such as a printer are not taken into account, the printing completion time cannot be estimated with accuracy. In other words, using the methods disclosed in Japanese Laid-Open Patent Applications 2002-259110 and 2001-27941, the processing time can be estimated from the device processing time and amount of data transmission, but if a large number of jobs are stored in the device by other users, a substantial delay in the printing completion time can result.

OBJECTS AND SUMMARY

An object of the present invention is to provide an improved print time management program, print management apparatus, print time management apparatus and print time management method that resolve the problem identified above and can calculate and indicate to the user the printing completion time with accuracy.

In order to attain such object, according to one aspect of the present invention, the print time management program causing a computer to execute processing including a first transmission step in which a request for transmission for information on the print processing time for the jobs in the print queue is sent to an external apparatus, a first receiving step in which the print processing time information sent from the external apparatus in response to the request for transmission of such information is received and a display step in which the printing completion time for the print data comprising the object of processing is displayed based on the print processing time information thus received.

It is preferred that the print time management program further execute on a computer a second transmission step in which a request for transmission of printing capacity information is sent to the external apparatus and a second receiving step in which such printing capacity information sent by the external apparatus in response to the request for transmission of such information is received, and that the display step further include a calculation step in which the print processing time for the print data to be processed is calculated based on the received printing capacity information, such that the printing completion time for the print data to be processed is displayed taking into account the calculated print processing time.

It is preferred that the print time management program further execute on a computer a first registration step in which a temporary job is registered in the print queue prior to the transmission of the first transmission step and a second registration step in which an actual job corresponding to and replacing the temporary job in the print queue is registered after transmission according to the first transmission step is completed.

It is preferred that the print time management program further execute on a computer a recording step in which the print processing time for the actual job is calculated and the calculated print processing time is recorded in the temporary job.

According to another aspect of the present invention, the print management apparatus includes a storage unit in which a print queue is stored, a receiving unit that receives from an external apparatus a request for transmission of print processing time information for the jobs in the print queue, an obtaining unit that obtains such information in response to a request for transmission thereof from the external apparatus and a transmission unit that sends to the external apparatus the obtained print processing time information.

According to another aspect of the present invention, the print management apparatus includes a storage unit in which the print queue is stored, a first receiving unit that receives registration of a temporary job from an external apparatus, a registration unit that registers the received temporary job in the print queue, a second receiving unit that receives registration of an actual job corresponding to the temporary job from the external apparatus and a replacing unit that replaces the registered temporary job with the actual job.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The printing system comprising this embodiment includes PCs including a printer driver that has a function to calculate the print processing time (i.e., the estimated print processing time) for the created job (the job comprising the object of processing) from the processing capacity of the output device (the device comprising the image forming apparatus), a function to obtain from jobs in the print queue of the output device the print processing times therefor, and function to enter a temporary job for reservation purposes in the queue and thereafter replace the temporary job with an actual job.

Based on this construction, in this printing system, the printer driver not only estimates the print processing time based on the processing capacity of the output device, but also obtains the print processing time information from other users' jobs queued in the output device, and estimates the final printing completion time (i.e., the estimated printing completion time) taking into account such print processing time for other users' jobs.

Figure 1:
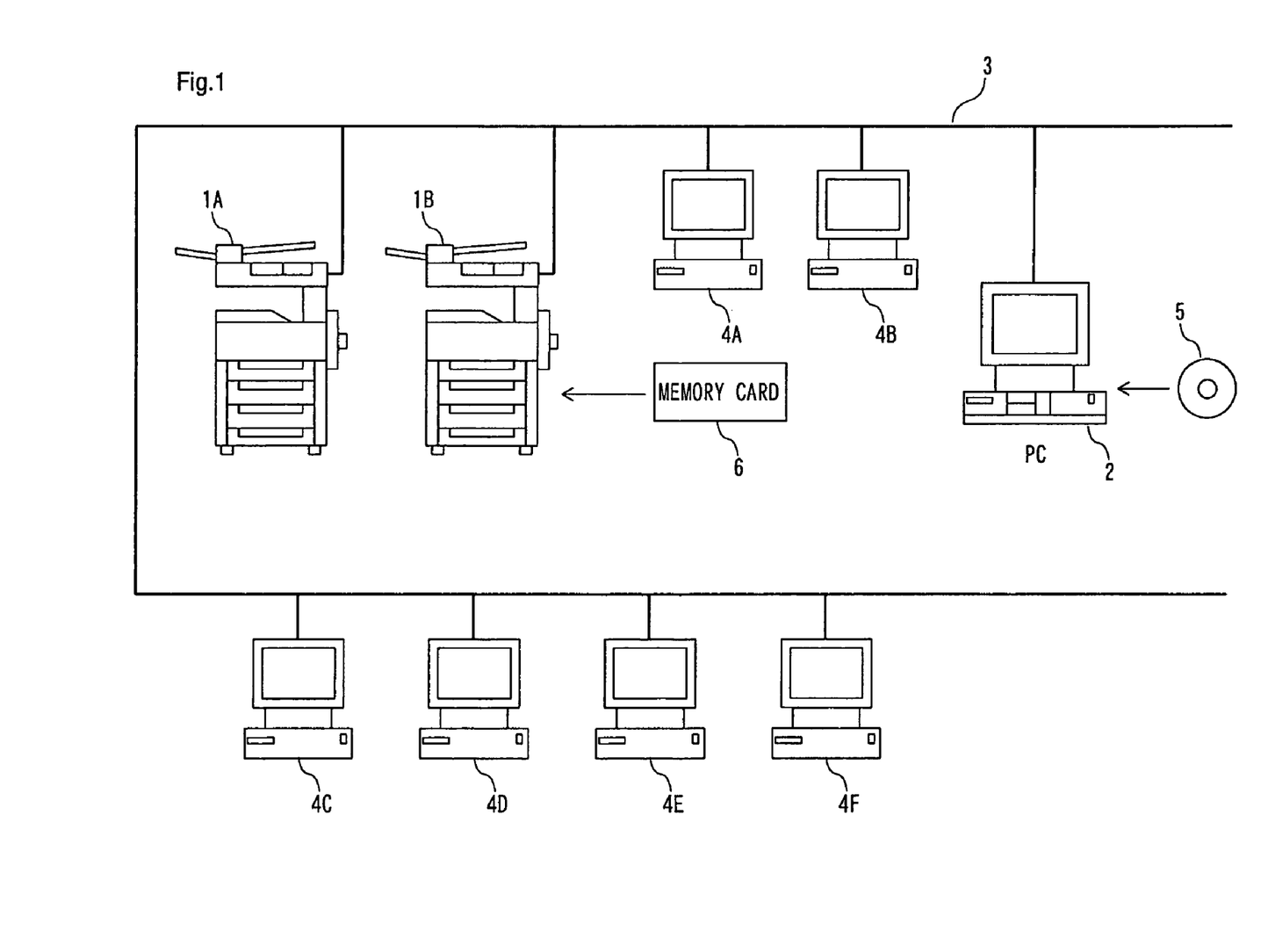
FIG. 1 is a drawing showing the basic overall construction of a printing system comprising one embodiment of the present invention.

FIG. 1 is a drawing showing the basic overall construction of a printing system comprising one embodiment of the present invention.

With reference to FIG. 1, the printing system 10 includes multi-function peripherals (MFPs) 1A and 1B, a printer server 2 and user computers 4A-4F, which are respectively connected to a network 3.

An example in which two MFPs 1A and 1B, one printer server 2 and six user computers 4A-4F are connected to the network 3 is shown in the drawing, but the number of MFPs may be singular or plural.

The MFPs 1A and 1B are image processing apparatuses, and work as (i) scanners to read original documents, (ii) image forming apparatuses to form images on printing media such as paper based on image data, and (iii) facsimile machines. Therefore, the MFPs 1A and 1B include image reading, copying, facsimile transmission/receiving and data printing functions.

The MFPs 1A and 1B receive job data output from the user computers 4A-4F via the printer server 2, and output such job data. The MFPs 1A and 1B also output image data output by their respective scanners.

A memory card 6, which is a portable and detachable storage device, is mounted in the MFP 1A. The print job management program and consumables management program stored in this memory card 6 are executed by the central processing unit (CPU) of the MFP 1A. It is also acceptable if the print job management program and consumables management program are not read from the memory card 6 but are instead stored in an IC chip type semiconductor memory mounted on a substrate. The MFP 1A executes the programs stored in the semiconductor memory using the CPU. If an EEPROM (Electrically Erasable/Programmable Read-Only Memory) is used for the semiconductor memory, for example, because the stored contents can be overwritten or additional contents can be written therein, the printing system may be constructed such that the other computers connected to the network 3 can overwrite the print job management program and/or consumables management program stored in the EEPROM of the MFP 1A, or add program contents thereto.

It is also acceptable if the MFP 1A downloads the print job management program, etc. from another computer connected to the network 3 and stores such programs in the EEPROM.

The print job management program and consumables management program are also recorded in the MFP 1B.

The MFP 1A and 1B may comprise printers that include an image forming function and are connected to the network 3.

The user computers 4A-4F are general personal computers. Various application programs that create print data, such as a document creation program, diagramming program, spreadsheet program, image editing program or image drawing program, are executed on the user computers 4A-4F. The user operates any one of the user computers 4A-4F such that these application programs are executed thereon and print data is created. When the user gives an instruction via such user computer that the print data should be output, job data comprising the print data and a job mode information is sent to the MFPs 1A and 1B via the printer server 2. Job mode information comprises data that defines the number of copies to print, the number of pages to be printed on one sheet of recording medium and the like. Print data and job mode information are together called job data. While job data is sent in the example described in this Specification, print data alone may be sent.

The MFPs 1A and 1B stores the received job data in their respective storage devices comprising hard disks, for example. The MFPs 1A and 1B output the stored job data in response to user operation.

Job data can be sent to all MFPs 1A and 1B from any of the user computers 4A-4F, or to at least one MFP selected from between the MFPs 1A and 1B. The MFP 1A or 1B to which the job data should be sent is selected at the time of job data transmission by the user of any the user computers 4A-4F.

The printer server 2 is a general personal computer. A CD-ROM (Compact Disk Read Only Memory) 5 is mounted in the printer server 2. The print job management program recorded in the CD-ROM 5 is read by a CD-ROM drive or the like and stored temporarily on the hard disk. It is then read from the hard disk into a random access memory (RAM) and executed by the CPU.

The network 3 consists of a local area network (LAN), the Internet or a general public circuit, and can be either a fixed-line or wireless network. An example in which the MFPs 1A and 1B and the printer server 2 are connected via the network 3 is shown in this Specification, but the MFPs 1A and 1B and the printer server 2 may be connected using a serial circuit or parallel circuit.

The user computers and MFPs may also be connected directly without using the printer server 2.

An example in which the print job management program and the like executed on the printer server 2 are distributed as recorded on a CD-ROM and the print job management program and consumables management program executed on the MFP 1A are distributed as recorded in a memory card 6 is described herein, but it is also acceptable if the programs are stored and distributed using other recording media, such as a flexible disk, a cassette tape, a hard disk, an optical disk (MO (Magnetic Optical Disk), MD (Mini Disk) or DVD (Digital Versatile Disk)), an IC card (including an memory card), an optical card, or a semiconductor memory such as a mask ROM, an EPROM (Erasable and Programmable ROM) or an EEPROM (Electrically Erasable and Programmable ROM) that carries programs in a fixed fashion.

Furthermore, the print job management program may be provided not on a recording medium but from another computer over the network 3 (or the Internet).

The concept 'program' herein encompasses not only programs that can be directly executed by an CPU, but also source-program type programs, compressed programs, encoded programs and the like.

In the printing system 10 of this embodiment, as described above, when the user operates any of the user computers 4A-4F and sends job data to the user-selected MFP 1A or 1B, the MFP 1A or 1B stores temporarily the received job data on a recording medium such as the hard disk. A job number is assigned to the job data, and a print job stored in either of the MFPs 1A or 1B can be specified using the job number. It is also acceptable if job numbers are not used, and a print job is specified using a file name for the data on which the print data included in the job data is based, for example.

The user computer (any of the user computers 4A-4F) does not directly send the job data to the MFP 1A or 1B but sends it to the printer server 2 while designating either of the MFPs 1A or 1B. Therefore, the transmission processing performed by the user computer (any of the user computers 4A-4F) is simple. The printer server 2 forwards the job data to the designated MFP 1A or 1B. As a result, the job data is stored in the MFP 1A or 1B.

Figure 2:
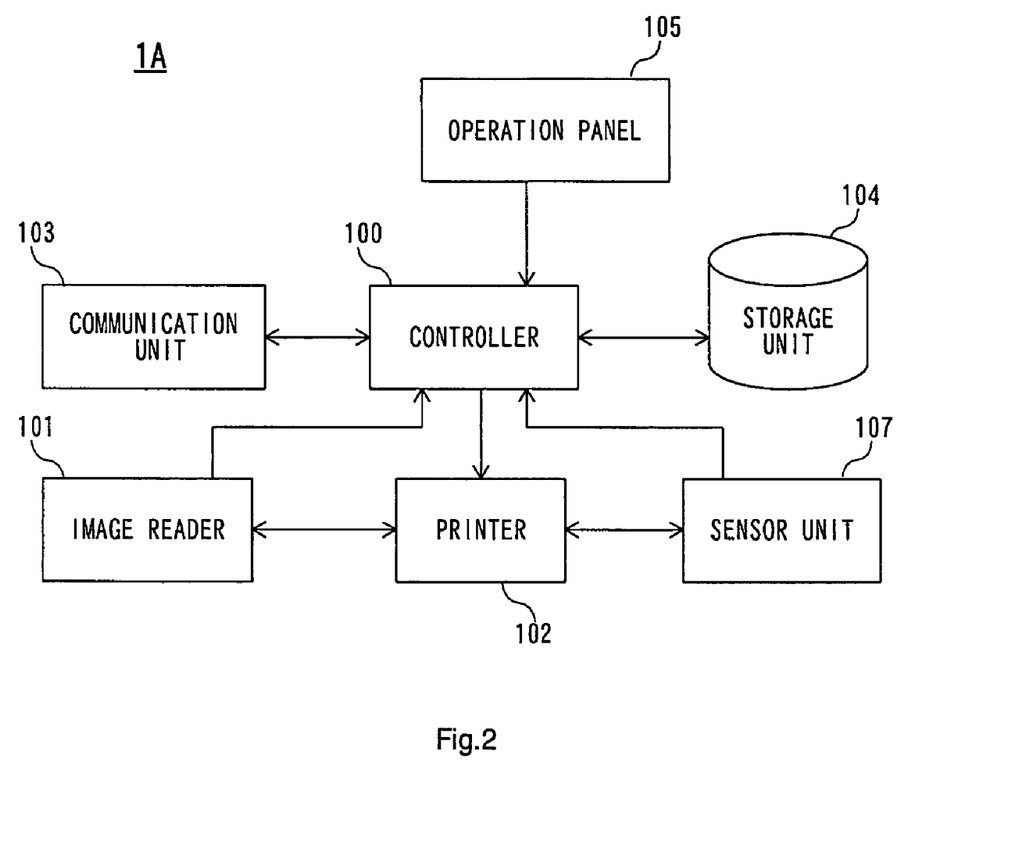
FIG. 2 is a function block diagram showing the basic functions of an MFP.

FIG. 2 is a function block diagram showing the basic functions of the MFPs of this embodiment.

Because the MFP 1A and 1B have the same functions, the MFP 1A will be used as an example in this description. With reference to FIG. 2, the MFP 1A includes a controller 100 that performs overall control of the MFP 1A, an image reader 101 that reads image data from original documents, a printer 102 that prints images on paper, a communication unit 103 that connects the MFP 1A to the network 3, a storage unit 104 that stores job data and the like, an operation panel 105 that comprises an interface to the user, and a sensor unit 107 that detects the remaining amounts of consumables and the like.

The communication unit 103 is an interface that connects the MFP 1A to the network 3. Through this unit, the controller 100 can communicate with the printer server 2 and the other MFP connected to the network, and receive job data from the user computers 4A-4F via the printer server 2. The controller 100 stores job data sent from the user computers 4A-4F in the storage unit 104. The storage unit 104 comprises a magnetic recording device such as a hard disk.

The image reader 101 irradiates the original document with light, receives the light reflected off of the original document via a CCD (Charge Coupled Device) and outputs image data to the controller 100. The controller 100 executes prescribed processing to the image data, such as noise removal and color conversion, and outputs print data to the printer 102.

The printer 102 is controlled by the controller 100 and forms an image on a recording medium comprising paper, for example, in accordance with the print data included in the job data stored in the storage unit 104, or in accordance with print data created based on the image data output by the image reader 101. The printer 102 forms images in a single color (black, for example). The printer may also be capable of color printing. The operation panel 105 is mounted on the top surface of the MFP 1A.

Figure 3:
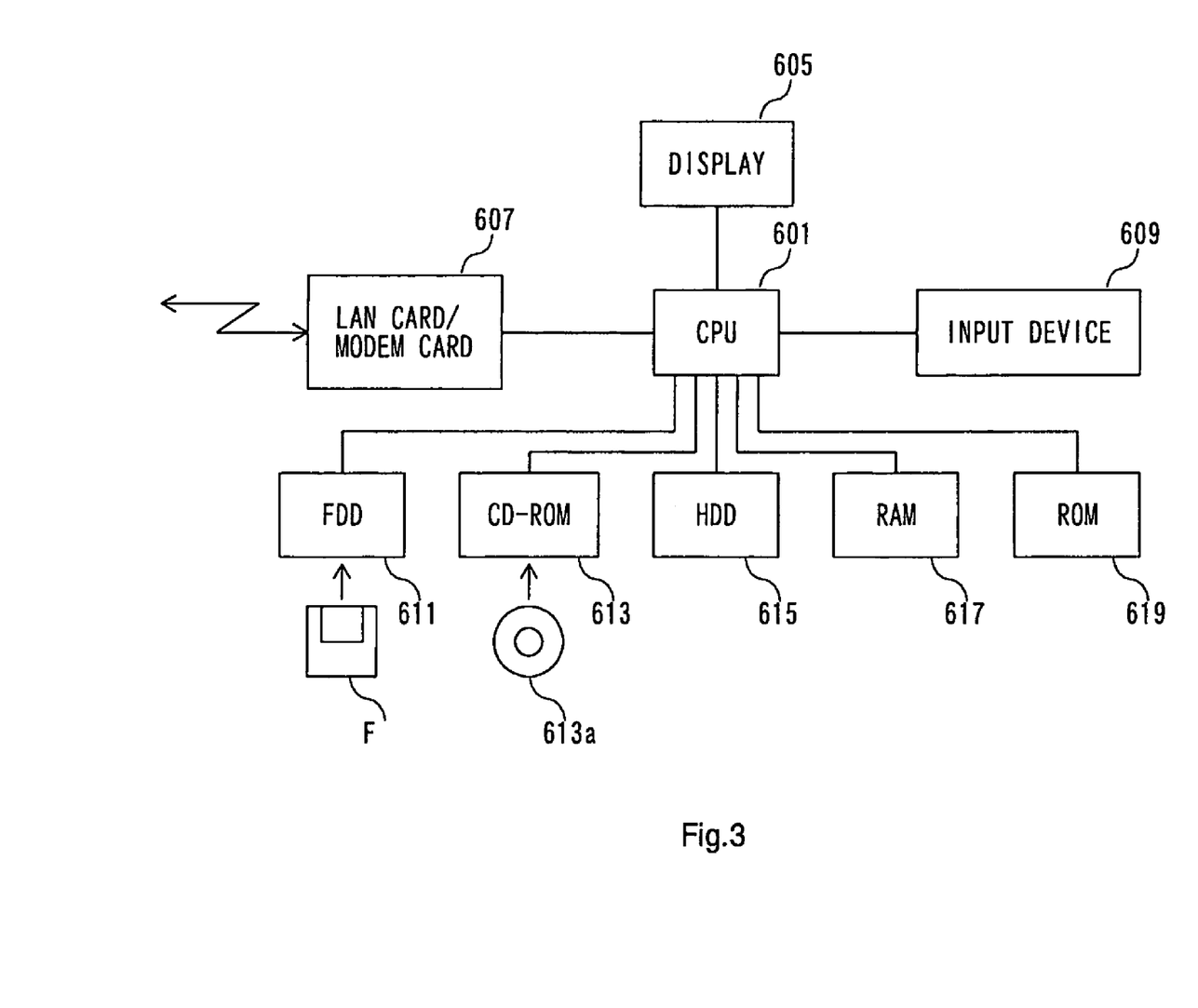
FIG. 3 is a block diagram showing the construction of any of the user computers 4A-4F or printer server 2 shown in FIG. 1.

FIG. 3 is a block diagram showing the construction of any of the user computers 4A-4F or the printer server 2 shown in FIG. 1.

With reference to the drawing, the user computers 4A-4F and the printer server 2 each include a CPU 601 that performs overall control of the apparatus, a display 605, a LAN card (or modem card) 607 that enables connection to the network or communication with external apparatuses, an input device 609 comprising a keyboard and a mouse, a flexible disk drive 611, a CD-ROM drive 613, a hard disk drive 615, a RAM 617 and a ROM 619.

Data such as a program recorded on a flexible disk F can be read via the flexible disk drive 611, and data such as a program recorded on a CD-ROM 613a can be read via the CD-ROM drive 613.

Figure 4:
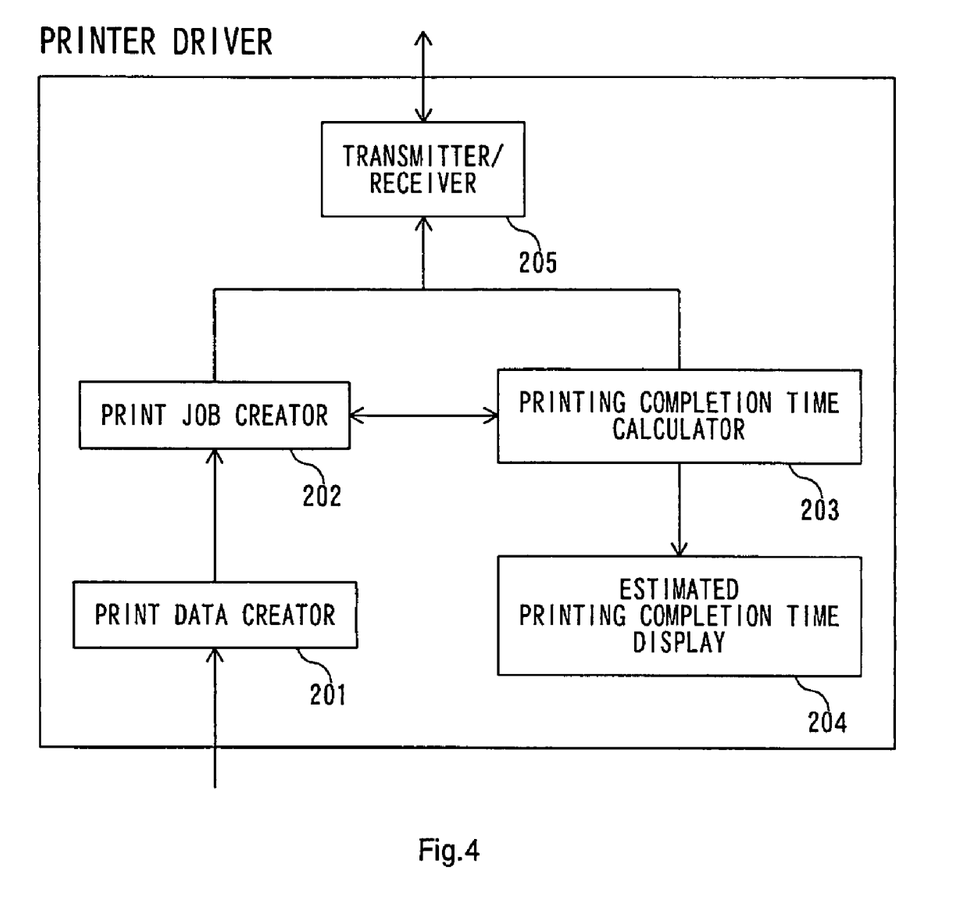
FIG. 4 is a drawing showing the construction of the printer driver included in the user computer shown in FIG. 3.

FIG. 4 is a drawing showing the construction of the printer driver included in the user computer shown in FIG. 3.

With reference to the drawing, the printer driver includes a print data creator 201 that receives data for printing from the application program and creates print data, a print job creator 202 that creates a print job based on the print data, a transmitter/receiver 205 that enables communication with the output device, a printing completion time calculator 203 that calculates print processing time and estimated printing completion time in response to a request from the print job creator 202, and an estimated printing completion time display 204 that displays the estimated printing completion time.

The printing completion time calculator 203 that has received a print processing time calculation request from the print job creator 202 obtains information regarding the printing capacity of the output device via the transmitter/receiver 205. It then calculates the print processing time for the print data comprising the object of processing based on the obtained printing capacity information.

The print processing time obtained as a result of the calculation is forwarded to the print job creator 202, whereby a reservation temporary job that includes the print processing time is created. The reservation temporary job is input to the output device via the transmitter/receiver 205.

The printing completion time calculator 203 then obtains the information regarding the print processing time for each job in the queue in the output device via the transmitter/receiver 205. The obtained print processing times are added together, and the print processing time for the print data, which was obtained as a result of the above calculation, is added thereto. The sum is deemed the estimated printing completion time. The estimated printing completion time is them supplied to the estimated printing completion time display 204, which displays such estimated printing completion time to the user.

The print job creator 202 creates an actual job, and sends it to the output device via the transmitter/receiver 205. The output device that has received the actual job replaces the reservation temporary job therewith.

As described above, the printer driver obtains information on the output device capacity when it creates a print job, and calculates the print processing time for that job taking into account the output device capacity and the nature of the job it has created. This print processing time is then included in the job.

When a print job has been created, the printer driver calculates the print processing time immediately before inputting the job to the output device.

It then checks the print queue of the output device, and if jobs are standing by for printing, it obtains print processing time information for each such job. The print processing time for the job that was first calculated and the print processing time for the other jobs in the queue are then added together. The sum is deemed the final estimated printing completion time and is displayed to the user.

Because the estimation of the printing completion time becomes inaccurate if another user enters a job in the output device after the checking of the print queue but before the printer driver enters its own job, the printer driver enters a reservation temporary job that includes the first-calculated printing processing time in the output device at the time of checking of the print queue. When an actual job is entered, the output device replaces the reservation temporary job with the actual job.

Because the printer driver can estimate the printing completion time for its job taking into account the printing capacity of the output device and the printing processing time for the jobs in the print queue and display the estimated printing completion time in this fashion, the printing completion time can be estimated with accuracy via the printer driver even in an environment using an output device that can be used by a number of people connected to the network simultaneously.

Figure 5A:
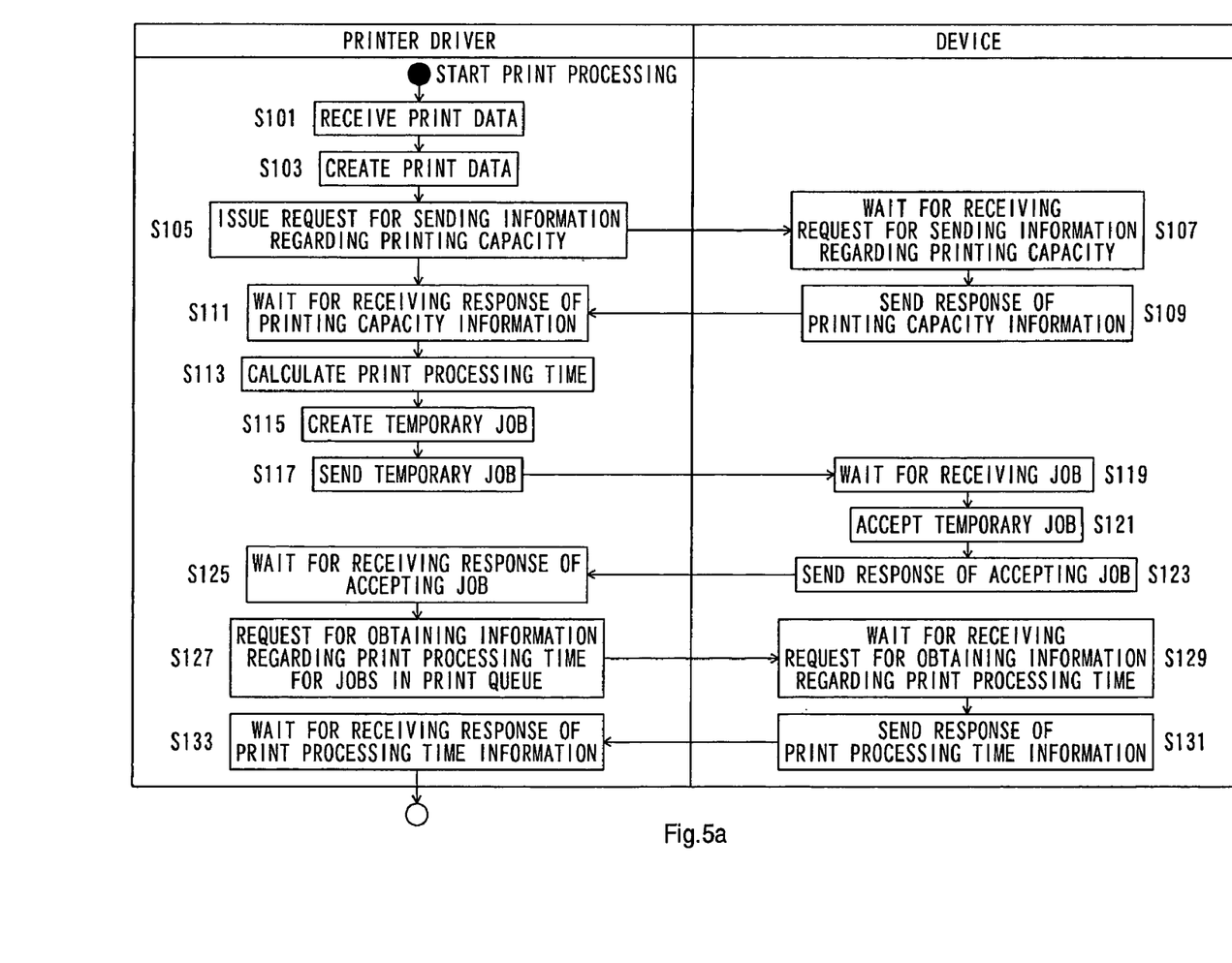
FIG. 5a and FIG. 5b are drawings showing the flow of processing between the printer driver and the output device.
Figure 5B:
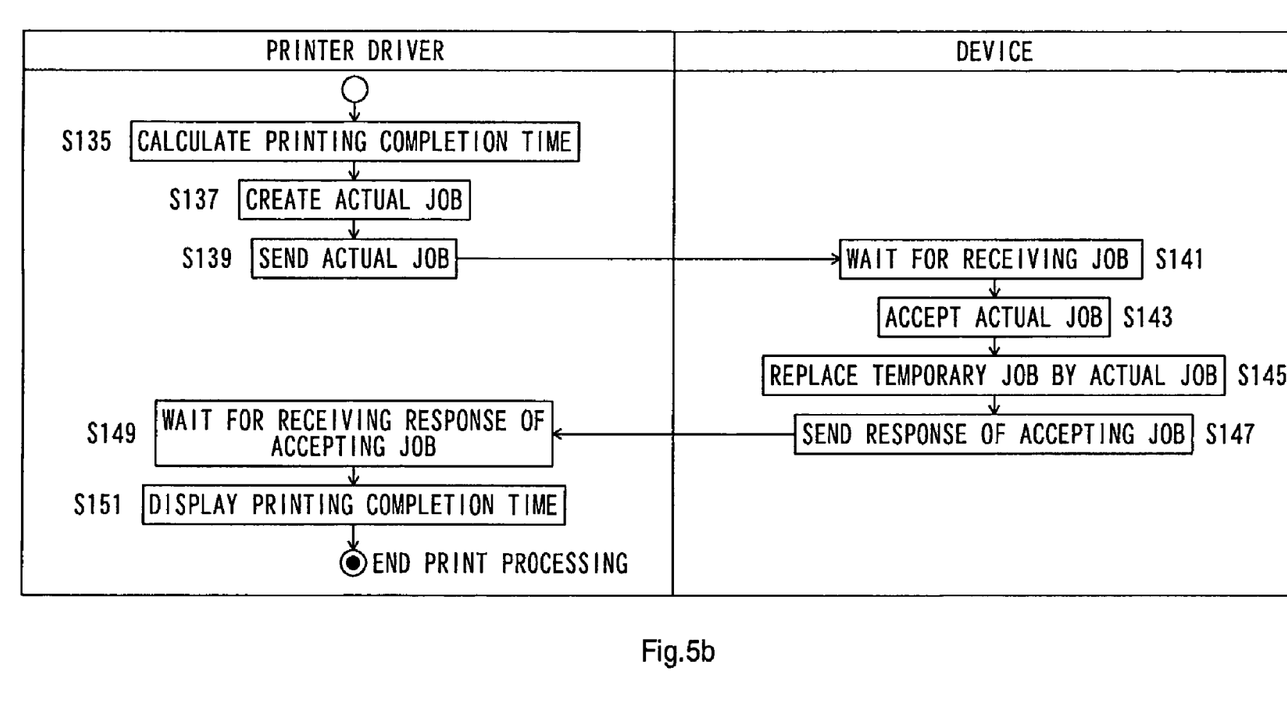

FIG. 5a and FIG. 5b are drawings showing the sequence of operations executed between the printer driver and the output device.

With reference to the drawings, in step S101, if the printer driver has been instructed to start print processing and has received print data, in step S103, it creates print data to be used.

In step S105, the printer driver issues a request for printing capacity information from the output device. The output device waits for such request in step S107, and if such request is received, it sends a response comprising printing capacity information to the printer driver in step S109.

In step S111, the printer driver waits to receive such response, and if it is received, the printer driver calculates the print processing time taking into account the job comprising the object of processing and the printing capacity in step S13.

A temporary job is created by the printer driver in step S115, and the temporary job is sent to the output device in S117.

The output device waits to receive a job in step S119, and if a temporary job is received in step S121, the output device registers it and sends a job accepted response to the printer driver in step S123.

The printer driver waits to receive a job accepted response in step S125, and if a job accepted response is received, the printer driver sends the output device a request for information regarding the print processing time for the jobs in the print queue in step S127.

In step S129, the output device waits to receive a request for print processing time information, and if such request is received, the output device sends a response comprising print processing time information to the printer driver in step S131.

In step S133, the printer driver waits to receive a print processing time information response, and if such response is received, the printer driver calculates the (estimated) printing completion time in step S135 by adding together the print processing time calculated in step S113 and the print processing time received in step S133.

In step S137, the printer driver creates an actual job corresponding to the temporary job and sends the actual job to the output device in step S139.

In step S141, the output device waits to receive a job, and if an actual job is received, the output device accepts such job in step S143. It is then determined in step S145 whether the temporary job for the thus accepted actual job resides in the print queue, and if so, the temporary job is replaced by the actual job.

In step S147, the output device sends a job accepted response to the printer driver.

In step S149, the printer driver waits to receive a job accepted response, and if such response is received, the printer driver displays the printing completion time calculated in step S135 to the user in step S151.

Figure 6:
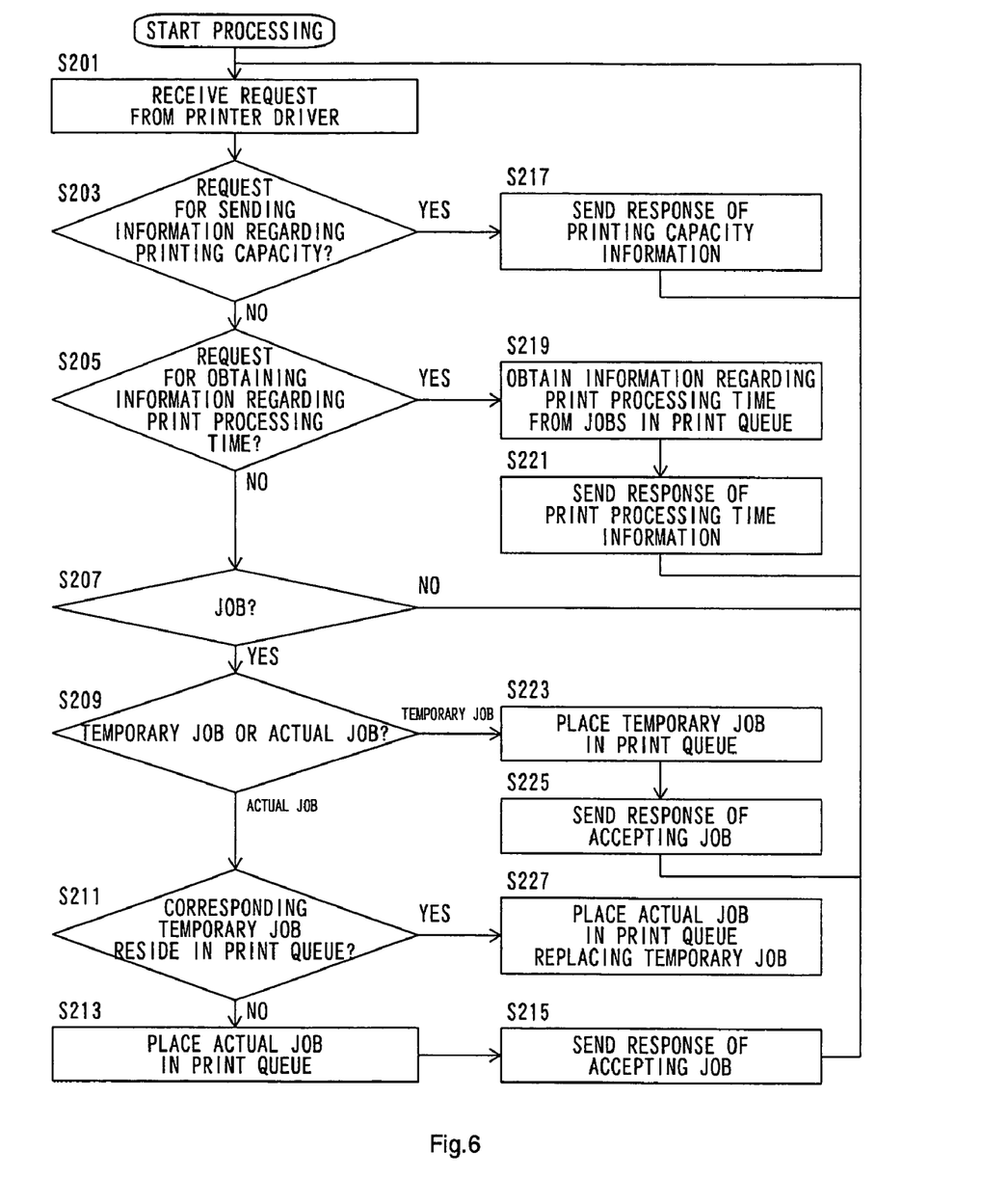
FIG. 6 is a flow chart showing the operations performed by the output device.

FIG. 6 is a flow chart showing the sequence of operations carried out by the output device.

With reference to the drawing, if a request is received from the printer driver in step S201, it is determined in step S203 whether it is a request for information on the printing capacity. If the answer is YES in step S203, printing capacity information is sent to the printer driver in step S217 as a response. Here, 'printing capacity' information consists of the print time required per page of the specified paper size (or per prescribed data amount), the print time required for the specified mode such as stapling, and the like.

If the answer is NO in step S203, it is determined whether a request for print processing time information was received in step S205, and if the answer is YES, print processing time information is obtained from the jobs in the print queue in step S219. A print processing time information response is then sent to the printer driver in step S221.

If the answer is NO in step S205, it is determined whether the data received in step S207 constituted a job.

If the answer is YES in step S207, it is determined in step S209 whether the job was a temporary job or an actual job. If it was a temporary job, it is placed in the print queue in step S223, and a job accepted response is sent to the printer driver in step S225.

Where it is determined that the job received in step S209 was an actual job, it is determined in step S211 whether a corresponding temporary job resides in the print queue. If it does, the actual job is placed in the print queue, replacing the temporary job in step S227, and a job accepted response is sent to the printer driver in step S215.

If it is determined in step S211 that a corresponding temporary job does not exist, the actual job is placed in the print queue in step S213, and the operation in step S215 is carried out.

Figure 7:
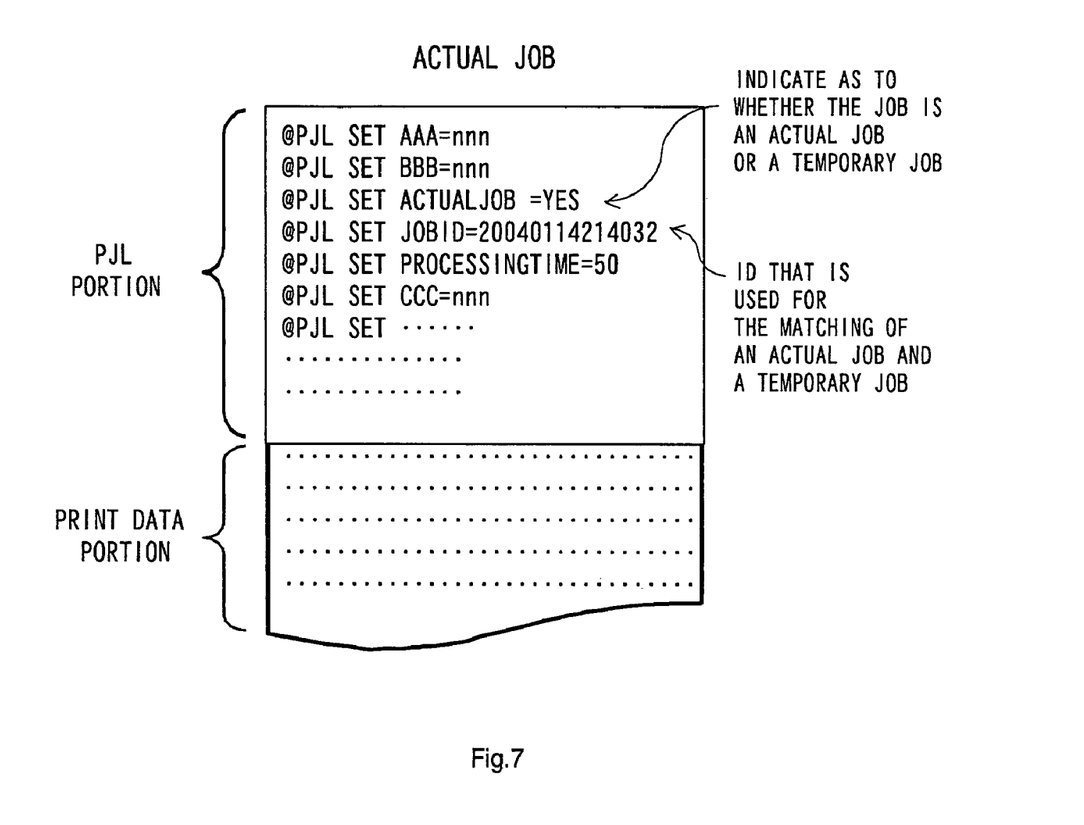
FIG. 7 is a drawing showing the construction of an actual job.

FIG. 7 is a drawing showing the construction of an actual job.

With reference to the drawing, an actual job consists of a PJL (Printer Job Language) unit and a print data unit.

The PJL unit is the part that in which the data regarding the job is recorded, and indicates whether the job is an actual job or a temporary job based on the description of @PJL SET-ACTUAL JOB=YES. If this description is 'YES', that means that the job is an actual job, while if it is 'NO', that means that the job is a temporary job.

In addition, the @PJL SET JOBID description in the PJL unit shows the ID that is used for the matching of an actual job and a temporary job.

Furthermore, @PJL SET PROCESSINGTIME indicates the time (print processing time) required for processing of the actual job. The time required to process the jobs stored in the queue can be learned from this description.

Figure 8:
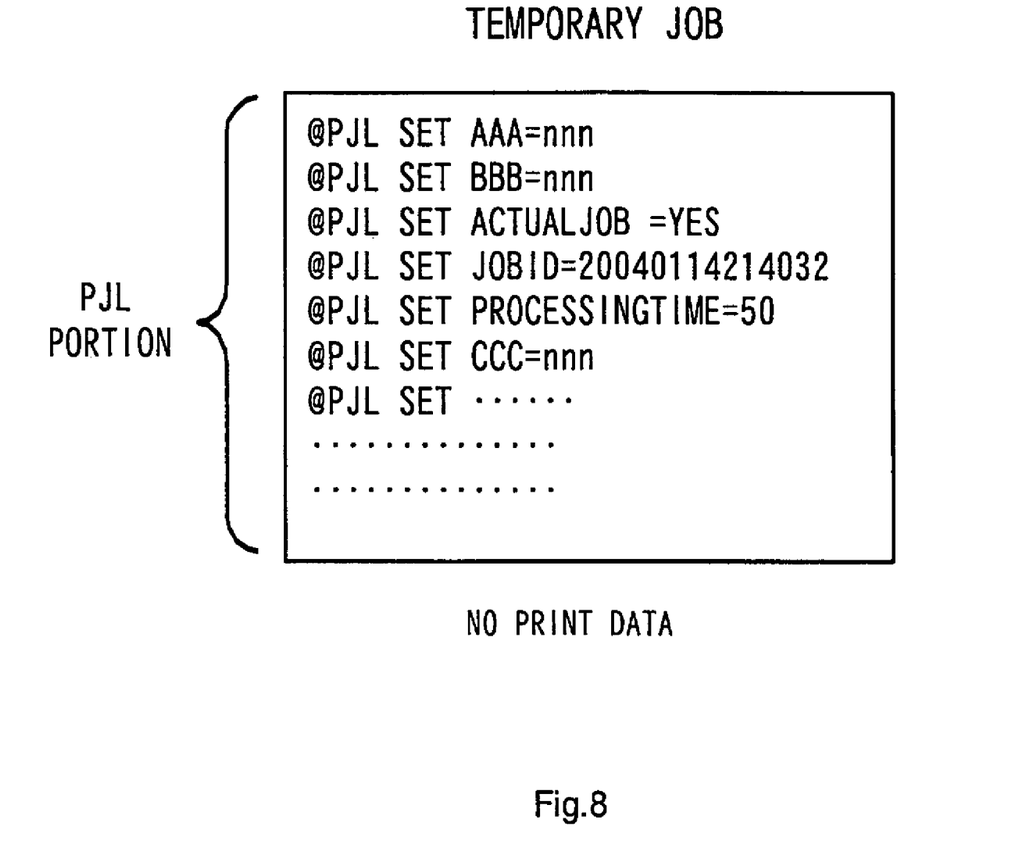
FIG. 8 is a drawing showing the construction of a temporary job.

FIG. 8 is a drawing showing the construction of a temporary job.

With reference to the drawing, a temporary job includes a PJL unit but no print data unit. In addition, the description of @PJL SET ACTUALJOB is 'NO'. The description of @PJL SET PROCESSINGTIME in a temporary job also shows the time required to process the actual job corresponding to that job. Consequently, even if a temporary job that does not include print data is registered, the print processing time for the actual job corresponding to such temporary job can be learned.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart thererfrom.

What is claimed is:

1. A computer-readable medium embodying a print time management program causing a computer to execute processing comprising:
   a first registration step of registering a temporary job not including any print data in a print queue of an external apparatus;
   a first transmission step of transmitting to the external apparatus a request for transmission of print processing time information for jobs in the print queue;
   a first receiving step of receiving the print processing time information transmitted from the external apparatus in response to the request for transmission of the print processing time information;
   a second registration step of registering an actual job including print data in the print queue, the actual job corresponding to the temporary job and replacing the temporary job in the print queue; and
   a display step of displaying printing completion time for print data to be processed based on the received print processing time information.

2. A computer-readable medium embodying a print time management program according to claim 1, wherein said processing further comprising:
   a second transmission step of transmitting to the external apparatus a request for the transmission of printing capacity information;
   a second receiving step of receiving the printing capacity information transmitted by the external apparatus in response to the request for transmission of the printing capacity information; and
   wherein said display step further include a calculation step of calculating the print processing time for the print data to be processed based on the received printing capacity information, such that the printing completion time for the print data to be processed is displayed taking into account the calculated print processing time.

3. A computer-readable medium embodying a print time management program according to claim 1, wherein said processing further comprising a recording step of calculating print processing time for the actual job and recording the calculated print processing time in the temporary job.

4. A print management apparatus comprising:
   a storage unit that stores a print queue;
   a first accepting unit that accepts registration of a temporary job not including any print data from an external apparatus;
   an obtaining unit that obtains print processing time information for jobs in the print queue;
   a registration unit that registers the accepted temporary job in the print queue;
   a transmission unit that transmits to the external apparatus the obtained print processing time information;
   a second accepting unit that accepts registration of an actual job including print data and corresponds to the temporary job from the external apparatus; and
   a replacing unit that replaces the registered temporary job with the actual job.

5. An image forming apparatus, comprising:
   a print management apparatus according to claim 4; and
   a printer that prints images based on the jobs in the print queue.

6. A print time management apparatus comprising;
   a first registration unit that registers a temporary job not including any print data in a print queue of an external apparatus;
   a first transmission unit that transmits to the external apparatus a request for transmission of print processing time information for jobs in the print queue;
   a first receiving unit that receives the print processing time information transmitted from the external apparatus in response to the request for transmission of the print processing time information;
   a second registration unit that registers an actual job including print data in the print queue, the actual job corresponding to the temporary job and replacing the temporary job in the print queue; and
   a display unit that displays printing completion time for print data to be processed based on the received print processing time information.

7. A print time management apparatus according to claim 6, further comprising:
   a second transmission unit that transmits to the external apparatus a request for transmission of printing capacity information;
   a second receiving unit that receives the printing capacity information transmitted by the external apparatus in response to the request for transmission of the printing capacity information; and
   a calculation unit that calculates the print processing time for the print data to be processed based on the received printing capacity information,
   wherein said display unit displays the printing completion time for the print data to be processed taking into account the calculated print processing time.

8. A print time management apparatus according to claim 6, further comprising a recording unit that calculates the print processing time for the actual job and records the calculated print processing time in the temporary job.

9. A print time management method comprising:
   a first registration step of registering a temporary job not including any print data in a print queue of an external apparatus;
   a first transmission step of transmitting to the external apparatus a request for transmission of print processing time information for jobs in the print queue;
   a first receiving step of receiving the print processing time information transmitted from the external apparatus in response to the request for transmission of the print processing time information;
   a second registration step of registering an actual job including print data in the print queue, the actual job corresponding to the temporary job and replacing the temporary job in the print queue; and
   a display step of displaying printing completion time for print data to be processed based on the received print processing time information.

10. A print time management method according to claim 9, further comprising:
 a second transmission step of transmitting to the external apparatus a request for transmission of printing capacity information;
 a second receiving step of receiving the printing capacity information transmitted by the external apparatus in response to the request for transmission of the printing capacity information; and
 wherein said display step further include a calculation step of calculating the print processing time for the print data to be processed based on the received printing capacity information, such that the printing completion time for the print data to be processed is displayed taking into account the calculated print processing time.

11. A print time management method according to claim 9, further comprising a recording step of calculating print processing time for the actual job and recording the calculated print processing time in the temporary job.

* * * * *